United States Patent
Bachfischer et al.

(10) Patent No.: US 7,159,006 B2
(45) Date of Patent: Jan. 2, 2007

(54) METHOD AND APPARATUS FOR PROPRIETARY DATA INTERFACE IN A DISTRIBUTED TELECOMMUNICATIONS SYSTEM

(75) Inventors: Richard Bachfischer, Boca Raton, FL (US); Jack Bloch, Boca Raton, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 795 days.

(21) Appl. No.: 10/109,149

(22) Filed: Mar. 28, 2002

(65) Prior Publication Data

US 2002/0147831 A1    Oct. 10, 2002

Related U.S. Application Data

(60) Provisional application No. 60/279,295, filed on Mar. 28, 2001, provisional application No. 60/279,279, filed on Mar. 28, 2001.

(51) Int. Cl.
*G06F 15/16* (2006.01)
(52) U.S. Cl. .................. 709/200; 709/223; 370/235
(58) Field of Classification Search ............... 374/242; 709/223–236, 200–202; 370/229–240; 710/307
See application file for complete search history.

(56) References Cited

U.S. PATENT DOCUMENTS

| | | | | | |
|---|---|---|---|---|---|
| 5,546,452 | A | * | 8/1996 | Andrews et al. | 379/219 |
| 5,737,320 | A | * | 4/1998 | Madonna | 370/258 |
| 6,058,427 | A | * | 5/2000 | Viswanath et al. | 709/231 |
| 6,480,597 | B1 | * | 11/2002 | Kult et al. | 379/242 |

OTHER PUBLICATIONS

Wikipedia, the free encyclopedia, "Ethernet", Author Unknown, Accessed From: http://en.wikipedia.org/wiki/Ethernet on Sep. 14, 2005.*
Wikipedia, the free encyclopedia, "Digital Signal 0", Author Unknown, Accessed From: http://en.wikipedia.org/wiki/Digital_signal_0 on Sep. 14, 2005.*
"Heartbeat", Horms, Accessed From: http://www.vergenet.net/linux/has/html/node11.html.*

* cited by examiner

*Primary Examiner*—Moustafa M. Meky

(57) ABSTRACT

The invention comprises a data bottleneck prevention method and system for preventing date bottlenecks from occurring in the Inter-Connect Controller (ICC) of a distributed telecommunications system which includes an Ethernet and a plurality of Media Control Platforms (MCPs) on one side of the ICC and a Network Services Processor (NSP) on the other side of the ICC. The data on the NSP side of the ICC is broken up into convenient 8 bit packages while the data on the Ethernet side of the ICC runs at the standard bit rate.

10 Claims, 5 Drawing Sheets hiQ R1.0 RACK CONFIGURATION

METHOD AND APPARATUS FOR PROPRIETARY DATA INTERFACE IN A DISTRIBUTED TELECOMMUNICATIONS SYSTEM

CROSS REFERENCE TO RELATED APPLICATIONS

This application claims the benefit of priority under 35 U.S.C. 119(e) to two copending U.S. Patent Provisional Applications, Ser. Nos. 60/279,295 and 60/279,279, both filed on Mar. 28, 2001, the contents of each of said applications being incorporated by reference herein.

This application is also related to the following U.S. Patent Applications: U.S. patent application Ser. No. 10/109,293 filed Mar. 28, 2002 entitled Distributed Architecture for a Telecommunications Software Switch; U.S. patent application Ser. No. 10/108.603 filed Mar. 28, 2002 entitled Distributed Architecture for a Telecommunications System; U.S. patent application Ser. No. 10/109,128 filed Mar. 28, 2002 entitled Method and Apparatus for Messaging Protocol Within a Distributed Telecommunications Architecture; U.S. patent application Ser. No. 10/109,196 filed Mar. 28, 2002 entitled Method and Apparatus for Providing A Software Adaptation Layer in a Telecommunications System; U.S. patent application Ser. No. 10/115,453 filed Mar. 28, 2002 entitled Method and Apparatus for a Deriving a Standard MAC Address from A Physical Location: U.S. patent application Ser. No. 10/109,157 filed Mar. 28, 2002 entitled Method and Apparatus for Centralized Maintenance System within a Distributed Telecommunications Architecture, the contents of each of said applications being incorporated by reference herein.

BACKGROUND OF THE INVENTION

1. Field of the Invention

This invention relates to a system and method for preventing data bottlenecks in a distributed telecommunications systems.

2. Description of Related Art

Existing distributed telecommunications systems work well at relatively low speeds, but as data speeds and volume are increased the data tends to bottleneck at the Inter-Connect Controller (ICC) level. This is especially true if the Media Control Platforms (MCP) are scaled up but the rest of the system is not modified to handle the extra load. As a consequence, the system can either freeze up or produce unacceptable errors and/or unnecessary downtime.

SUMMARY OF THE INVENTION

Briefly described, the invention comprises a method and system that permits an Inter-Connect Controller (ICC) to handle more data as parts of the network are scaled up in speed and volume without introducing any bottlenecking of the data handled by the system.

The invention may be fully understood by reference to the following drawings.

DETAILED DESCRIPTION OF THE PREFERRED EMBODIMENT

Figure 1:
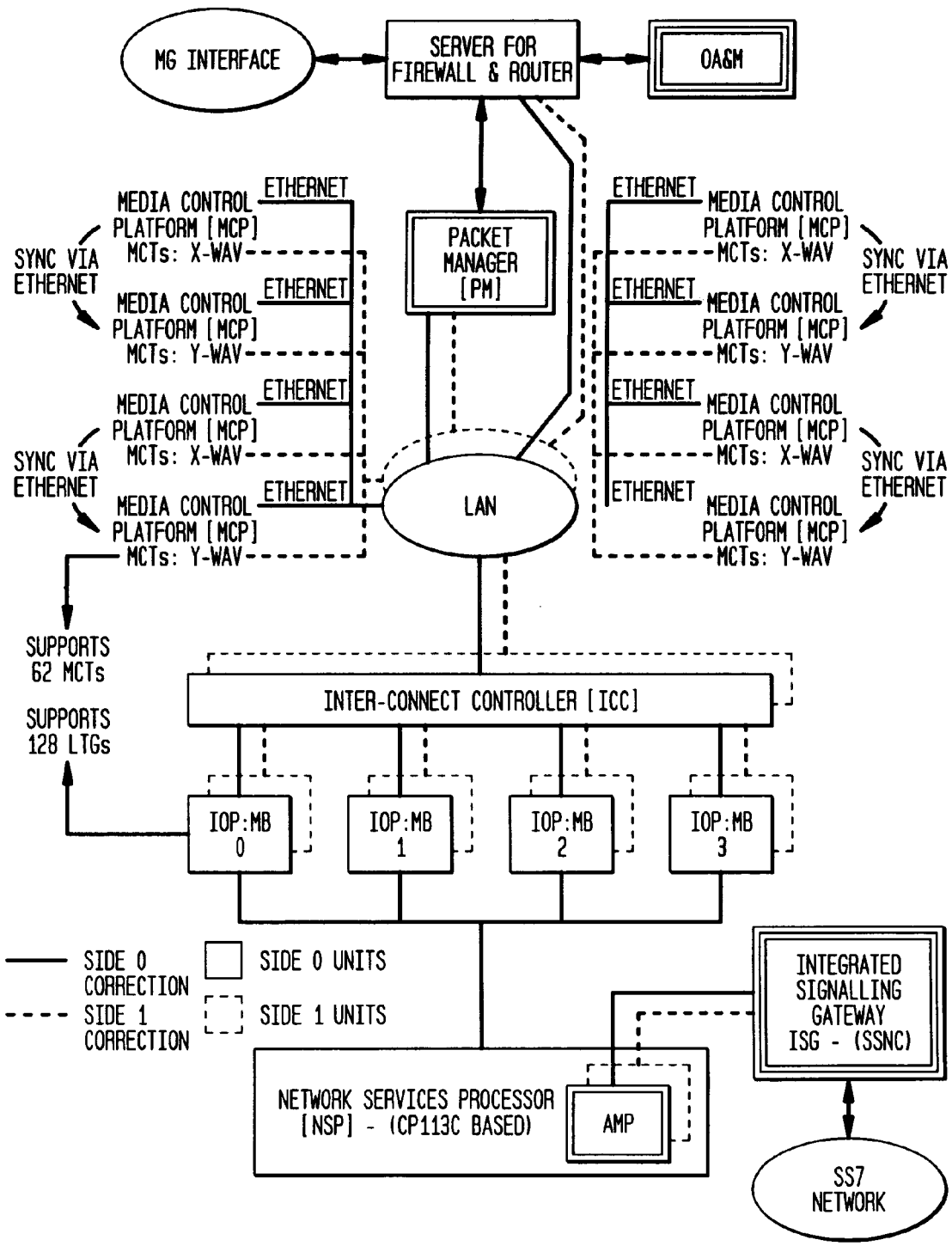
FIG. 1 is a schematic diagram of the overall architecture of the preferred embodiment of the invention.

The basic HiQ architecture as shown in FIG. 1 is split into seven functional parts, namely, the Network Services Processor (NSP), the Inter-Connect Controller (ICC), the Packet Manager (PM), distributed Media Control Platforms (MCP), the Integrated Signaling Gateway [ISG -(SSNC)] and lastly, the connection medium which allows all of the functional blocks to communicate with one another. The connection medium itself provides the seventh part as well, since it is split into two entities, namely, the connection between the NSP and ICC and the connection between the ICC and distributed platforms.

Network Services Processor (NSP)

The NSP is realized utilizing the hardware (HW) of the EWSD CP113C. The hardware (HW) is robust, stable, fault tolerant and provides a "ready-made" environment to ensure that the feature rich EWSD call processing software (SW) will run without problems. Essentially the NSP consists of standard EWSD CP113C HW up to and including the I/O interfaces. This includes BAP's, CAP's, CMY, B:CMY, IOC's and IOP's. The existing storage media (MDD) is supported as well. The role of the NSP is to provide the feature/CALLP database. It also performs the loading of necessary data to the distributed MCP's and performs those coordinated functions necessary to keep the system running (e.g. maintenance, recovery, administration, alarming, etc.). The advantage of using the CP113C HW is that all of the necessary functionality exists and can be re-used with a minimum set of changes (as opposed to re-implementation). One further advantage of this re-use is the fact that all of the existing OSS's can be supported.

Inter-connect Controller (ICC)

Figure 3:
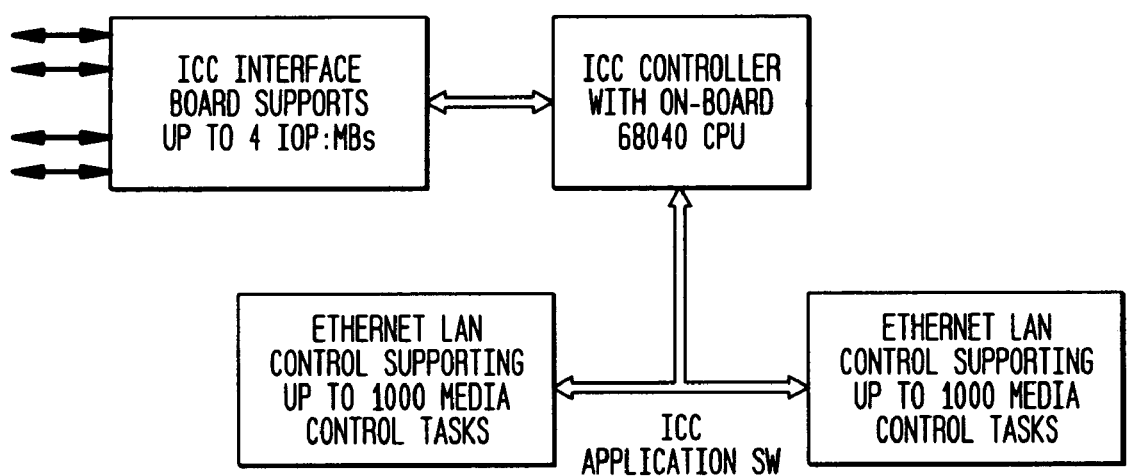
FIG. 3 is a functional block diagram of the Inter-Connect Controller (ICC).

The ICC Is a multifunctional unit and is illustrated functionally in FIG. 3. In a first embodiment (up to 1,000,000 BHCA). It must provide a bi-directional interface between the NSP and the distributed MCP's, PM, and Signaling Gateway. In addition to providing the Interface, It also provides the protocol conversion between standard EWSD messaging (i.e. MBU/MCH based addressing) and Ethernet MAC addressing since the actual platform interconnect Is provided via fast Ethernet (100 MB/s LAN segment(s)). The ICC also handles the routing test interface from the NSP. This is necessary to satisfy the HW/SW interface which requires the functional buffering/switching devices (SN and MB from EWSD architecture) to be present Lastly, it must supervise the LAN interface (i.e. reflect the connection status of the distributed platforms to the NSP), detect any LAN faults and report any faults to the NSP. In addition, in a second embodiment (supporting up to 4,000,000 BHCA), the ICC performs inter-platform routing for any distributed platform. Essentially, this means that whenever a peripheral platform (Including MCP, PM, Signaling Gateway) needs to communicate with a second (or multiple) peripheral platform, the message is sent to the ICC and the ICC reroutes it to the required destination. This is necessary during the second phase to offload the NSP since the above mentioned messages would normally be routed via the NSP. This bypass provides the NSP with additional capacity.

The ICC has the following functional blocks. The interface board is a pure hardware (HW) component which takes care of the signaling interface between CP 113C (IOP:MB. This is an 8-bit parallel interface) and ICC. The interface board connects directly with a controller board, which acts as a multiplexer. One controller board supports up to 8 interface connections and, therefore, by extension, 8 IOP: MB interfaces. If additional IOP:MB interfaces must be supported (up to 7 will be required to support 4,000,000 BHCA), this is accomplished by adding interface boards (which support up to 4 interfaces) and/or controller boards. The next functional block is the application SW itself. This entity communicates with the controller board via DMA (bi-directionally), so that NSP messages may be received and sent. Lastly, the LAN controller provides the actual interface to the MCPs, PM, and Signaling Gateway. The application entity therefore provides the bi-directional connection path between the NSP format messages and the Ethernet messages.

The ICC HW is realized by using a standard slot based 500 MHZ Pentium III (or better) CPU slotted into a passive backplane. The Interface card HW requires a standard ISA connection, while the controller HW uses a PCI slot. The LAN controller(s) also use standard PCI interfaces.

Media Control Platform (MCP)

Figure 2:
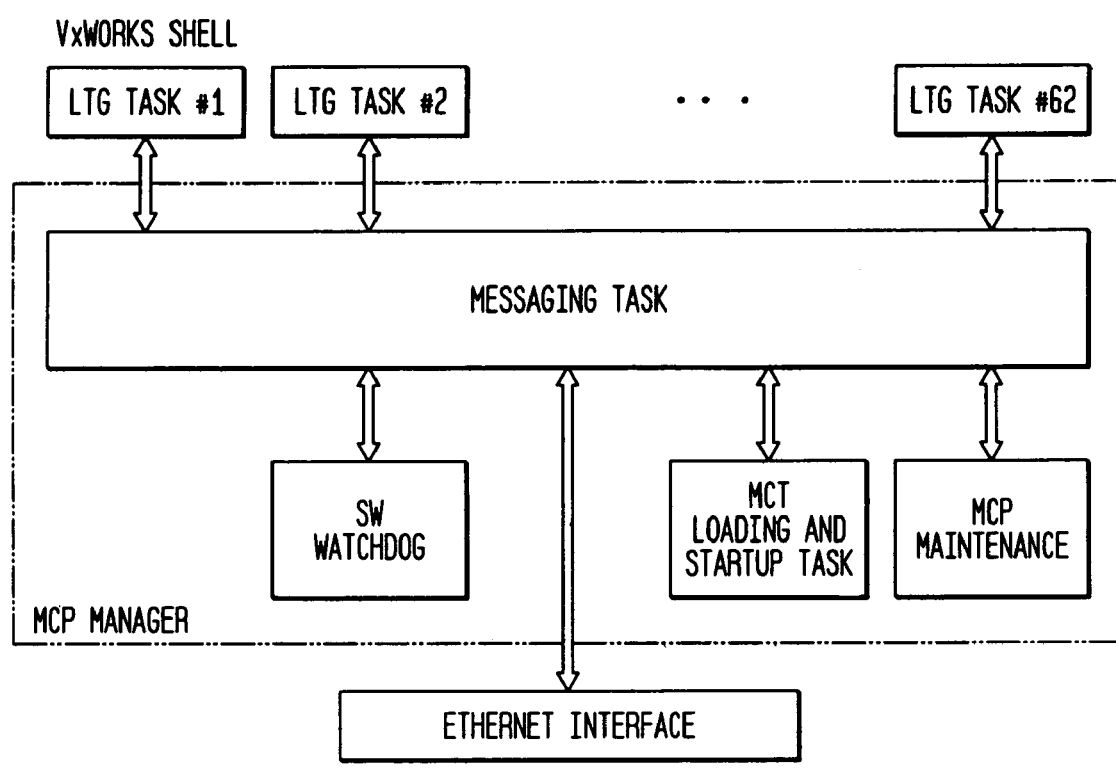
FIG. 2 is a functional block diagram of a Media Control Platform (MCP).

The MCP consists of a slot based CPU (Pentium III 500 MHZ or better) in a backplane and is illustrated in FIG. 2. The MCP provides a platform for media control functions, which work with the software in the NSP to provide media control features.

MCP Software is divided into the following two functions:

Media Control Functions

MCP Manager Functions

Each MCP supports up to 62 Media Control Tasks (MCTs) running simultaneously under a real-time operating system (VxWorks). Each Media Control Task is an independent call-processing entity. EWSD LTG software is reused extensively to provide the MCT function.

MCP Manager Functions are distributed across the following tasks:

Messaging task: This task is multi-functional. It provides the interface to the Ethernet for communication between all tasks on the MCP and the NSP or other distributed platforms. It also provides an interface with the ICC for maintenance of the LAN and the message channels associated with the Media Control Tasks.

SW Watchdog task: This task is responsible for monitoring all MCP tasks to ensure that each task is running correct.

MCT Loading and Startup task: This task provides an interface to the NSP for loading of MCT software. It is also responsible for managing and manipulating the context associated with each MCT, and for spawning each MCT task in its correct context.

MCP Maintenance task: This task performs general maintenance functions on the MCP, including handing reset requests from the NSP, routing test and audit functions, utilities and processing firmware upgrades.

Packet Manager (PM)

The PM provides the interface to the Media Gateway for the HiQ architecture. The incoming signaling is done via ISUP (ISDN User Part), BICC (Bearer Independent Call Control) and MGCP (Media Gateway Control Protocol) messaging. The platform hardware HW is realized using a commercially available Sun FT1800 fault tolerant system. Connection to the HiQ is done via redundant Ethernet paths on the internal LAN. The PM is an external device, which is not fully integrated into the HiQ architecture. The PM is totally decoupled from the HiQ as far as any recovery, configuration, or maintenance strategy. There is a form of loose coupling, which is realized by a periodic message sent from the NSP to the PM via each redundant LAN segment.

The PM must respond to this message on each LAN side. The purpose of this messaging is two-fold in that it serves to inform the NSP that the PM is still available and secondly, the message from NSP to PM should contain the active LAN side so that the PM knows which LAN side to use when transmitting to the NSP and/or any other peripheral platform.

Connection Medium

The connection medium is split into two parts. The first part covers the interface between NSP and ICC. This is an 8-bit serial interface (proprietary) which mimics the IOP: MB to Message Buffer Interface. This interface is completely realized in hardware. The second part of the connection medium covers the connection from ICC towards the system periphery (MCP, PM, SP). This connection is realized using a Fast Ethernet (100 MB/S) LAN segment. The EWSD HW based addressing algorithm will be converted to a MAC addressing algorithm.

System Redundancy

The HiQ is a fully redundant, fault-tolerant system. As stated earlier, the NSP is realized using the CP113C HW from the existing EWSD configuration. Since this is already a fault tolerant system, no extra development is required to ensure redundancy in the NSP. The ICC/LAN redundancy is realized due to the fact that two copies of each exist (side 0 and side 1). A failure of one unit automatically causes a switchover to the secondary unit (without any service interruption). This is handled via the Fault Analysis software SW (FA:MB is adapted to handle ICC) running on the NSP. The LAN itself uses a "productive redundancy" concept. This means that both LAN sides are active but each carries half the traffic (this is accomplished with no additional development effort by using the standard LTG message channel distribution, i.e., each task has a different default active/ standby side). If a LAN failure occurs, the switchover causes the remaining LAN to carry the full traffic loan. The MCP itself is not a redundant platform, however, since the MCT SW supports redendancy (LTGC(B) concept), it is possible to make each MCT redundant. This is realized by distributing the MCT's in such a way that each task has a partner which runs on a different MCP. That means that the failure of a single MCT results in its functionality being taken over by the "Partner" board. Ultimately, this says that the failure of an MCP board results in the switchover of each MCT being carried by that board. The SSNC redundancy is realized at a HW level but in a different manner than within the NSP. Each unit (e.g. MPU) has a redundant partner. For example, the MP's consist of two MPU's which run microsynchronously. This same concept applies to AMX, ACCG, ALI-B and LIC. The concept of a system half does not exist with SSNC. The redundancy therefor is realized on a per unit basis.

Integrated Signaling Gateway [ISG]

The SSNC is used to perform the signaling gateway functionality. The SSNC is a multi-processor system consisting of a single shelf (minimum configuration) of hardware. The SSNC, is in reality, its own system with Its on Maintenance devices disks and optical devices. It is "loosely coupled" to the NSP via an ATM30 link. The SSNC will perform the task of terminating the #7 from the network and converting the signaling into HiQ compatible messaging. The SSNC further controls the routing of messages to NSP or MCT's. Further, the SSNC will route #7 messages from the HiQ to the network. Initially, the SSNC will terminate pure SS7 links. The SS7 links may be replaced by SCTP associations. The SSNC consists of the following HW: MP:SA (Main Processor:Stand-Alone), AMX, ACCG, ALI, LIC, along with associated SCSI disks and optical drives. The MP:SA is the system master and performs the control functionality such as OA&M, loading etc. The AMX provides the connectivity between system pieces, i.e. allows all of the units to communicate with one another via a proprietary ATM protocol called ITP (Internal Transport Protocol). The MP:DEP performs the SLT (Signaling Link Termination) functionality. It is responsible for the #7 handling. The ACCG is the source of the system clock. The ALI provides the alarm interface for the system. Additionally, it provides the interface for the radio clock reference signal (i.e. network reference). The LIC's provide the termination for the SS7 links. Th. LIC's will in the future be replaced by MP:DEP-E (Ethernet) for SCTP termination.

Interface Connect Controlled Software

Figure 4:
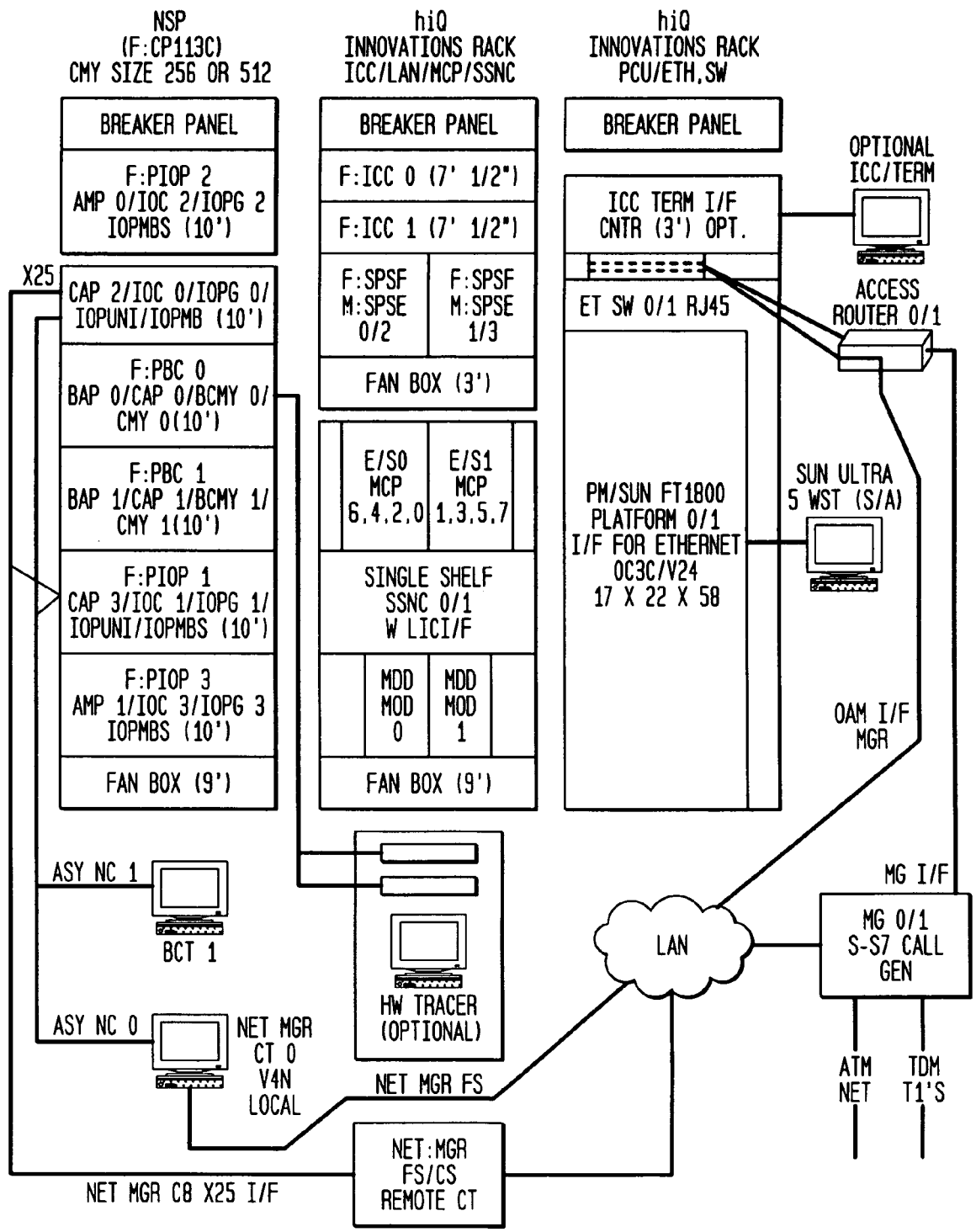
FIG. 4 is the rack configuration of the invention.
Figure 5:
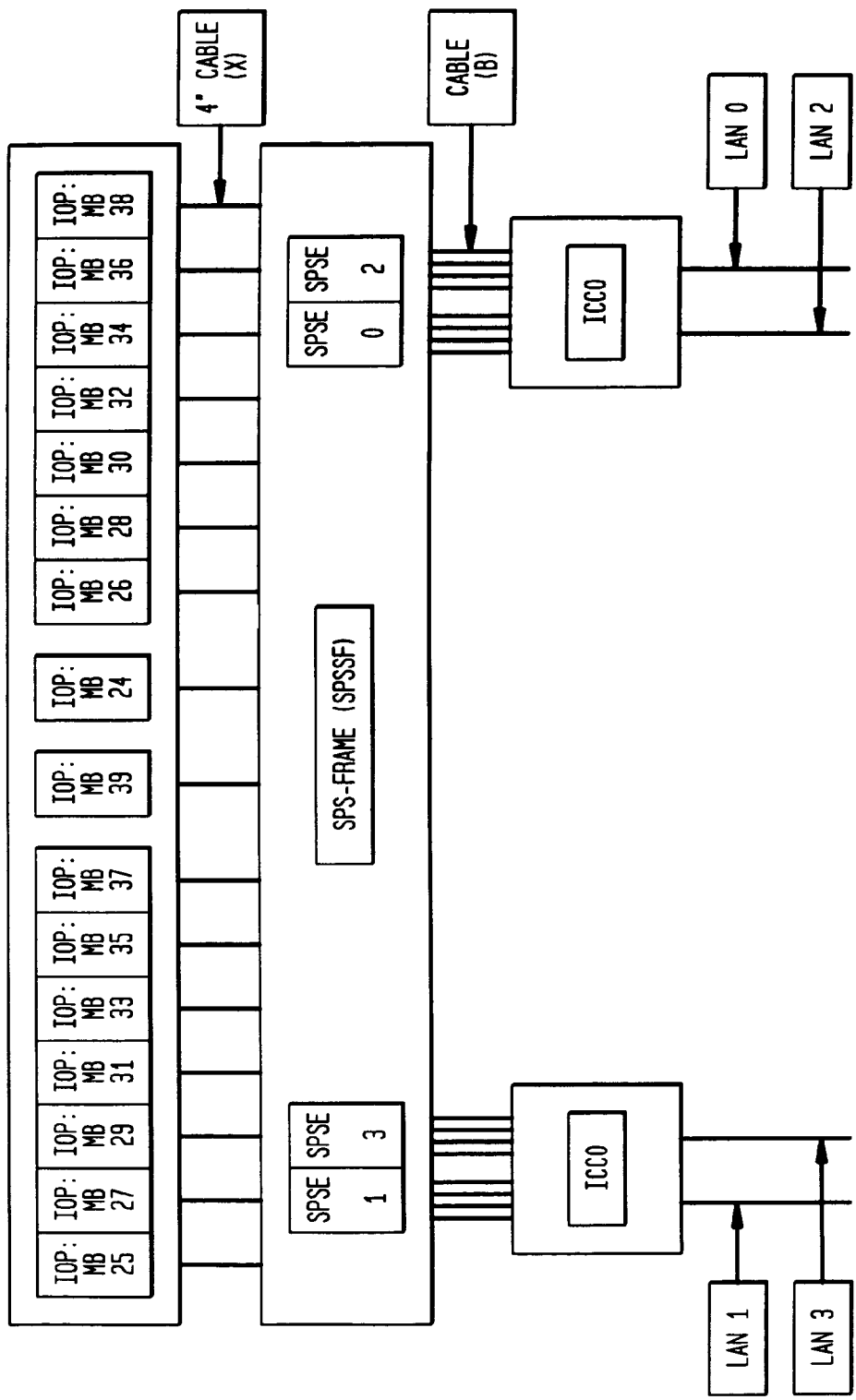
FIG. 5 illustrates the interconnection between the ICC and the Network Services Processor (NSP).

An ICC as shown in FIGS. 4 and 5 has to assume the buffering functionality of the MB and the distribution capability of the SN.

Therefore the ICC-SW receives all messages from the NSP via the ICC-HW and analyzes the destination processor number to define the necessary actions.

If the processor number addresses the MB or SN the ICC internally processes the message, creates the corresponding answer for the NSP and updates its own database for active message channels.

For all commands addressing the external units connected via the LAN, the ICC-SW encapsulates the EWSD data structure within an Ethernet frame and sends it out to the LAN via NIC. Messages coming from the LAN are stripped of the Ethernet frame, analyzed and sent to the NSP or processed within the ICC.

Like the SN checks the LTG, the ICC has to supervise the connected LAN units. This is done by sending out a flag command every 0.1 seconds which has to be answered by all active LAN units. If a unit doesn't answer correctly a channel error is created and sent to the NSP to notify the error treatment for the defect unit.

The ICC is supervised by the NSP using the loop command, if there is an ICC-SW or an OS error that affects both redundant ICC and no reloop is sent back to the NSP a total outage of periphery will be detected. In case the standard MBB reset can't activate the ICC the NSP SW will escalate and send a MBD reset to both ICC over all available IOP:MB interfaces. This reset causes the ICC-HW to issue a HW-Reset to the CPU board and that restarts the OS.

Whenever a MBD reset is sent to the ICC the NSP-SW has to wait for the ICC to restart the OS and the ICC application SW, this will take about 3 minutes. Than a MBB reset is sent to the ICC and the normal activation to the NSP periphery takes place.

The first release of the ICC-SW runs under WIN98 and is created by using the Borland Delphi COMPILER for PASCAL. All later versions run under Linux and there is a Borland Delphi version available for Linux so the existing code can be easily ported to the new OS.

A SPSB controller board contains its own CPU (68040 Motorola) and the necessary FW is written in 68020 Motorola assembler language. The ASSEMBLER is available on the IBM (MVS) and is the same which is used for all NSP (CP) FW production.

Maintenance

Trouble Detection and Isolation

To ensure a proper system function the connections between the NSP and the MCP have to be checked in a periodic manner. In case an error is detected the faulty unit needs to be isolated to allow trouble shooting and corrective actions.

Inter-connect Controller Software & Firmware Functionality

The NSP sends out a loop command every 10 seconds to both ICC and the ICCs have to respond with reloop. If a reloop doesn't arrive in the NSP within 1 second the NSP detects a loss of the corresponding ICC interface and configures the ICC with its LAN side to "UNA".

The ICC supervises the MCP connection over the LAN and sends out a FLAG command every 0.1 seconds to all MCP on its LAN.

Error Detection and Handling

There are two different scenarios for no reloop.
ONE is for no reloop from all ICC interfaces.
TWO exist for no reloop of some ICC interfaces.
If the loop command is not answered at all a fault may exist within the ICC-SW or a major component which connects the NSP to the ICC.

The involved components, sorted by debugging order for case
ONE: SPSE, ICC
TWO: IOP;MB, SPSE, cable (B), Cable (X), ICC, SPS-Frame If the FLAG command is not answered at all a LAN-loop command is sent to the PM/PCU which test the IC-NIC, Ethernet-Switch and cable with the incoming LAN-reloop from the PM/PCU. If no LAN-reloop is received within the specified timeout period a HW-fault is present on the LAN.

The defect components, sorted by likelihood:
NIC, Cable (UTP5), Ethernet-Hub/Switch

Trouble Notification and Measurement

If a problem is encountered during normal system operation the craft has to be notified by the system using an alarm. The alarm indicates the defective system part and corrective action will take place.

All alarms indicating a system problem are recorded and output during maintenance measurements for record keeping.

Reliability

The ICC is used in a TELCO environment that requires a very high availability of all system components. To ensure the necessary MTBF of the ICC it uses proper cooling and high quality boards to assemble a unit. The power is supplied via the −48V DC network and all ICC HW is supervised by an internal monitor system.

Inter-Connect Controller Software & Firmware (SS:JMICC)

The ICC uses a Slot-CPU based processing unit that contains a watchdog for SW supervision and a monitor FW for the power, cooling fan, and heat sensor. In case of an error the NSP will be notified that the craft can take corrective action.

Messaging and LAN Interface

As the SN is replaced with the LAN all communication between the NSP and the periphery is handled via Ethernet. We use raw Ethernet within the soft switch to talk between all units. That gives optimal performance since the data overhead is small and the payload in an Ethernet frame contains all usable data.

Inter-connect Controlled Software & Firmware

A message coming from the NSP (EWSD format) is written to ICC memory (ICC input list) via the ICC-HW using bus master DMA. The ICC-SW scans the input list and takes out the new message, looks at the destination (processor number) and creates an Ethernet frame for messages directed to LAN units like MCP, PM/PCU . . . .

An Ethernet frame comprises the MAC address for source and destination, length and control info, data (payload) and CRC info to ensure error free transport. The ICC-SW compiles an Ethernet frame using the message from the NSP and encapsulates this message as the payload. The frame is written into the NIC output list and the NIC reads out this frame (via bus master DMA) and sends it out over the LAN.

The NIC listens on the LAN and receives Ethernet frames directed to the NSP and ICC. A new frame is written into the NIC input list, the ICC-SW scans the list and takes out the frame. After checking the frame for no CRC errors the ICC-SW extracts the payload, decodes the destination processor number and writes the data (EWSD format) into the ICC output list if the message is to terminate on the NSP.

The ICC-HW (controller board) scans the ICC output list, reads out the message via bus master DMA and sends it over to the NSP.

Utilities

Since the ICC sits between the LAN units and the NSP it can monitor the traffic of exchanged messages. There is a protocol file like the sg.oper used on the NSP that stores all messages going between NSP and LAN units. It is organized as a cyclic buffer and stores up to 300K messages which can be used for debugging purpose.

All input/output lists residing in ICC-memory can be dumped also.

Offline test of ICC-HW is supported to allow the debugging of HW problems related to the ICC.

Inter-connect Controller Software & Firmware Functionality

The ICC-SW runs without manual input from the keyboard and output to a monitor. If debugging is necessary a special state of the ICC-SW can be invoked via interrupt and the SW will start to communicate with the keyboard, mouse and monitor.

ICC-HW Errors

Embodiment 1

If a HW error is detected that points to the ICC the complete ICC unit has to been replaced. The ICC comprises a 4U rack mountable case that can be easily swapped out by a new ICC.

To find the defect board within the ICC an offline test is available that will help to debug the problem and put the ICC back in working condition so it is ready to replace another defect ICC in the future.

Embodiment 2

The compact PCI system allows an easy swap of individual modules so a defect within an ICC can be debugged in the system environment. Run the ICC diag via MML and swap ICC modules until the defective module is located.

ICC-HW upgrade from Embodiment 1 to Embodiment 2

A migration from the ICC 4U rack mount case to the ICC compact PCI system is done by installing the compact PCI frame in a rack with free space, configuring the old ICC HW to MBL and swinging over the cables from the old ICC to the new one. Than the ICC diagnostics command is issued to test the new ICC HW. After diag confirms that the ICC works correctly it will be configured back to active system duty.

The original ICC can become a bottleneck problem when the MOPS are scaled up in speed and volume. In such a case the MCPs could overwhelm the ICC with data thereby causing a data bottleneck that can cause the system to slow down dramatically of fail or create undesirable errors. The function of the ICC is to connect via LAN all MCPs with the NSP. This is a bi-directional function. On one side of the ICC there is located an 8 bit serial interface from the original EWSE environment which is to be preserved. The other side of the ICC Is a 32 bit Ethernet connection. In order to prevent data bottle necks due to scaled up MCPs, an data bottleneck prevention interface (IOP:MP) Is provided to break the data from the NSP to the ICC into 8 bit packages so that the original ICC can handle it while allowing the ICC to properly interface with the 32 bit Ethernet on the other side of the ICC. The interface breaks the data into 8 bit streams that the ICC can handle. This is shown in FIG. 5 as IOP:MP 24–39 and note, especially, the four SPSE sections 1, 3, 0 and 2 respectively connected to the ICC1 and ICC0.

While the invention has been described with reference to the preferred embodiment thereof, it will be appreciated by those of ordinary skill in the art that changes can be made in the parts and steps that comprise the invention without departing from the spirit and scope of the invention as a whole.

The invention claimed is:

1. A system for preventing data bottlenecks in distributed telecommunications system connected to an Ethernet, said system comprising;
   an Inter-Connect Controller (ICC) having a first and a second input side and wherein said first side is connected to said Ethernet
   a plurality of Media Control Platforms (MCPs) also connected to said first side of said ICC;
   a Network Services Processor (NSP) to coordinate maintenance, administration and alarming functions of the system and connected to said second side of said ICC via a plurality of non-multiplexed serial connections; and
   means connected between said ICC and said NSP for multiplexing said non-multiplexed connections to prevent message data communicated between said first and second sides of the ICC from becoming bottlenecked as the volume of message data from said MCPs is scaled up.

2. The system of claim 1 wherein said Ethernet interface connection is a 32 bit connection and said data bottle neck prevention means breaks data into easier to handle 8 bit packages in order to make them less likely to bottleneck in said ICC.

3. A method for preventing data bottlenecks in a distributed telecommunications system including an Ethernet, said system including an Inter-Connect Controller (ICC) having a first and a second input side wherein said first side is connected to said Ethernet, a plurality of Media Control Platforms (MCPs) also connected to said first side of said ICC and a Network Services Processor (NSP) connected to said second side of said ICC, said method comprising the steps of:
   a. providing communication at a first bit rate between said Ethernet and said first side of said ICC; and,
   b. selectively providing non-multiplexed serial communication between said NSP and said second side of said ICC at a second bit rate different from said first bit rate for conversion from said second bit rate to said first bit rate by multiplexing and conversion from said first bit rate to said second bit rate by demultiplexing, said NSP to coordinate maintenance, administration and alarming functions of the system.

4. The method of claim 3 wherein said first bit rate is provided by a 32 bit interface and said second bit rate is provided by a plurality of 8 bit interfaces.

5. The method of claim 4 wherein the first bit rate is 100 MB/sec.

6. The method of claim 4 wherein the plurality of 8 bit interfaces are each a serial interface.

7. The method of claim 3 further comprising the steps of:
   a. sending out a flag signal from the ICC at predetermined intervals which has to be answered by all active LAN units; and,
   b. if a LAN unit doesn't correctly answer sending out a channel error to the NSP to notify the error treatment of the defective unit.

8. The method of claim 7 further comprising the steps of:
   c. supervising the ICC by sending a loop command to the ICC; and,
   d. if no reloop is sent back by said ICC detecting an error in said ICC.

9. The method of claim 1 wherein the NSP is connected to said second side of said ICC, providing a messaging connection.

10. A system for preventing data bottlenecks in distributed telecommunications system connected to an Ethernet, said system comprising:
    an Inter-Connect Controller (ICC) having a first and a second input side and wherein said first side is connected to said Ethernet;
    a plurality of Media Control Platforms (MCPs) also connected to said first side of said ICC via said Ethernet
    a Network Services Processor (NSP) to coordinate maintenance, administration and alarming functions of the system and for communicating bi-directionally with said MCPs through said ICC via a plurality of serial connections, wherein each of said plurality of serial connections has a message transmission speed lower than a message transmission speed of said Ethernet; and,
    a least one interface module connectable with said ICC and having multiple serial interfaces connectable to said plurality of serial connections for multiplexing and demultiplexing messages from and to said plurality of serial connections to prevent message data communicated between said NSP and said MCPs from becoming bottlenecked as the volume of message data from said MCPs is scaled up,
    wherein additional interface modules are connectable with said ICC to accommodate increased volume of message data.

* * * * *